United States Patent
Hoffman et al.

(10) Patent No.: US 7,100,305 B2
(45) Date of Patent: *Sep. 5, 2006

(54) AIR DRYER MOUNTING ASSEMBLY

(75) Inventors: Fred Hoffman, Columbia Station, OH (US); Leonard Quinn, Lagrange, OH (US)

(73) Assignee: Bendix Commerical Vehicle Systems LLC, Elyria, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/605,394

(22) Filed: Sep. 27, 2003

(65) Prior Publication Data

US 2005/0066540 A1 Mar. 31, 2005

(51) Int. Cl.
*F26B 3/00* (2006.01)

(52) U.S. Cl. .............................. 34/351; 34/80; 96/147; 55/385.3; 55/DIG. 17; 285/62; 285/913; 95/118

(58) Field of Classification Search .................. 34/302, 34/330, 351, 473, 80, 81, 82; 95/52, 118; 96/4, 8, 147; 55/385.3, DIG. 17; 285/62, 285/913
See application file for complete search history.

(56) References Cited

U.S. PATENT DOCUMENTS

| | | | | |
|---|---|---|---|---|
| 1,993,201 A | * | 3/1935 | Yandell | 68/242 |
| 2,606,628 A | * | 8/1952 | Hasselwander | 55/319 |
| 3,353,339 A | * | 11/1967 | Walter | 96/137 |
| 4,052,178 A | * | 10/1977 | Frantz | 96/399 |
| 4,065,096 A | * | 12/1977 | Frantz et al. | 251/129.1 |
| 4,385,913 A | * | 5/1983 | Lane | 96/130 |
| 4,544,385 A | | 10/1985 | Tanaka | |
| 4,707,166 A | | 11/1987 | Khosropour | |
| 5,110,327 A | * | 5/1992 | Smith | 96/113 |
| 5,403,387 A | * | 4/1995 | Flynn et al. | 96/143 |
| 5,427,609 A | * | 6/1995 | Zoglman et al. | 95/98 |
| 5,595,588 A | * | 1/1997 | Blevins | 96/108 |
| 5,607,500 A | * | 3/1997 | Shamine et al. | 96/144 |
| 5,622,544 A | * | 4/1997 | Shamine et al. | 96/134 |
| 5,961,698 A | * | 10/1999 | Dossaji et al. | 96/130 |
| 6,094,836 A | * | 8/2000 | Mahoney et al. | 34/80 |
| 6,391,098 B1 | * | 5/2002 | Thomas | 96/111 |
| 6,730,143 B1 | * | 5/2004 | Nichols et al. | 95/118 |
| 6,878,194 B1 | * | 4/2005 | Hoffman et al. | 96/147 |
| 2002/0189456 A1 | | 12/2002 | Hoffman et al. | |

* cited by examiner

*Primary Examiner*—S. Gravini
(74) *Attorney, Agent, or Firm*—Calfee, Halter & Griswold LLP

(57) ABSTRACT

An improved system and method for mounting an air dryer is provided. The improved system and method employs a single centralized special fitting that secures the air dryer manifold to a reservoir. The bore in which the fitting is disposed is used to communicate air from the reservoir to the air dryer in order to purge the desiccant in the air dryer. The mounting assembly includes anti-rotational mechanisms which prevent the air dryer from rotating about its axis. The mounting assembly may also include a reservoir and a mounting bracket for the reservoir which uses less than 75 percent of a truck mounting rail height.

17 Claims, 12 Drawing Sheets

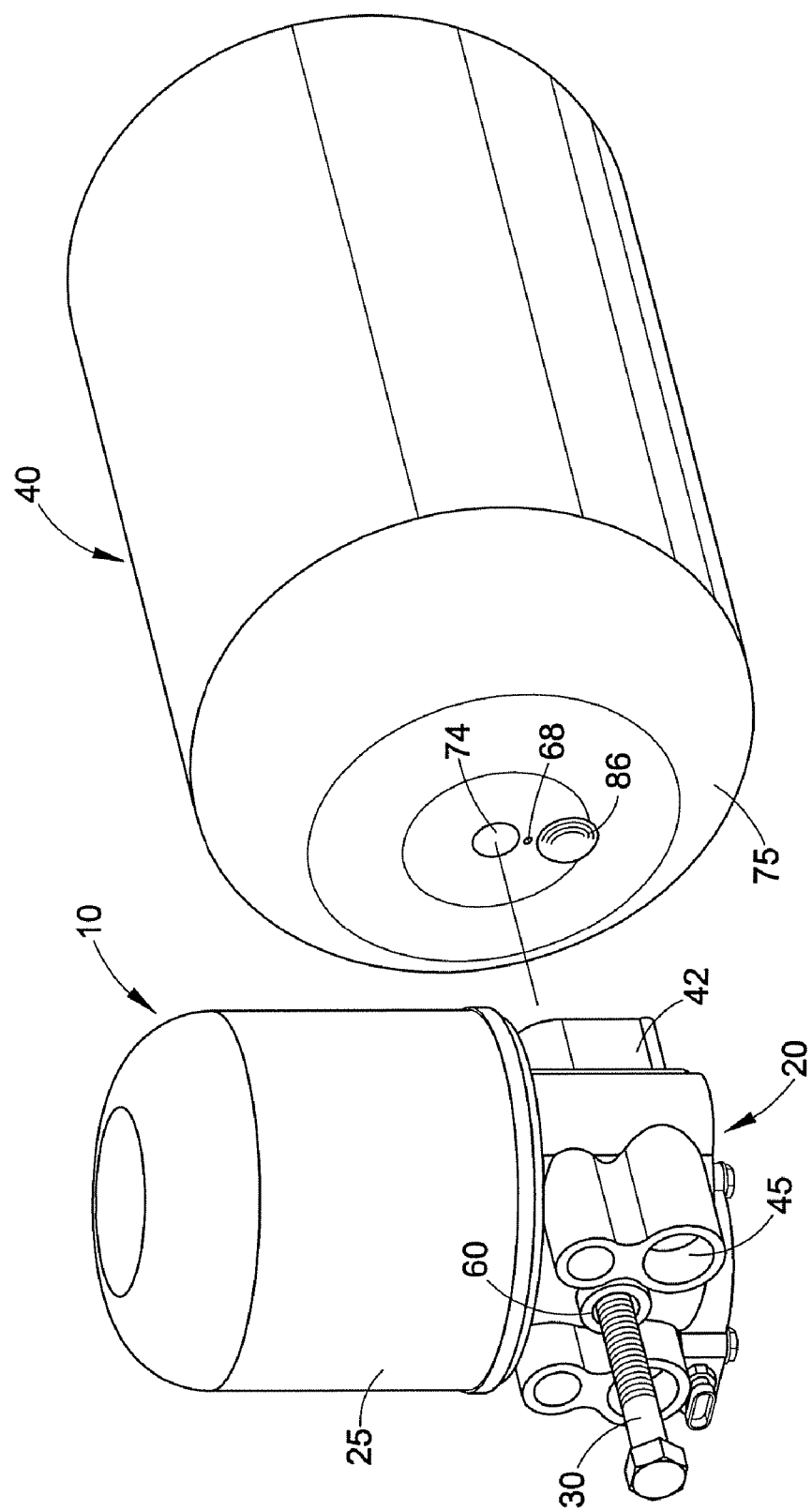

AIR DRYER MOUNTING ASSEMBLY

BACKGROUND OF INVENTION

The present invention relates to a mounting assembly for an air dryer, and more specifically to a mounting assembly for an air dryer for a commercial vehicle.

In compressed air braking systems, such as those used on commercial vehicles, an air dryer is typically placed in line after the compressor and prior to the rest of the components, such as the compressed air reservoir or air brake units. The air dryer removes harmful contaminants, such as dirt, oil, oil vapor, water and water vapor, from the compressed air, and thus provides clean, dry air to the components of the brake system. Clean dry air increases the reliability and life of the brake system, thereby reducing maintenance costs.

One issue that remains constant with regard to commercial vehicle air dryers is how to provide a better mounting arrangement so as to minimize the space consumed by the air dryer. In most commercial vehicles, mounting space is very limited. An improved mounting arrangement could free up valuable space for other components. Furthermore, the mounting arrangement of an air dryer defines the parameters used to design the air flow path to and from the air dryer. A more efficient air flow path can make the air dryer more effective and reduce the space required for mounting the air dryer assembly.

SUMMARY OF INVENTION

An improved air dryer mounting assembly is provided. The improved assembly provides for mounting assembly provides for many different mounting arrangements. Furthermore, the air dryer mounting assembly unifies the mounting apparatus with a purge passageway to provide a more compact and efficient air dryer assembly.

In one embodiment, the improved system includes a manifold and a desiccant cartridge. A central bore runs through the manifold wherein a fitting is disposed. A purge flow can communicate from a purge volume to the desiccant through the fitting bore. In one embodiment, the purge volume is disposed within a reservoir to which the air dryer is attached.

Other aspects of the present invention is an improved method of drying air and an improved method for mounting an air dryer. In an exemplary embodiment, an air dryer with a central bore is attached to a purge reservoir with a specialized fitting. The purge reservoir communicates with the air dryer through the central bore.

BRIEF DESCRIPTION OF DRAWINGS

FIG. 5 illustrates the mounting of the air dryer of FIG. 1A on another air reservoir embodiment;

DETAILED DESCRIPTION

Figure 1A:
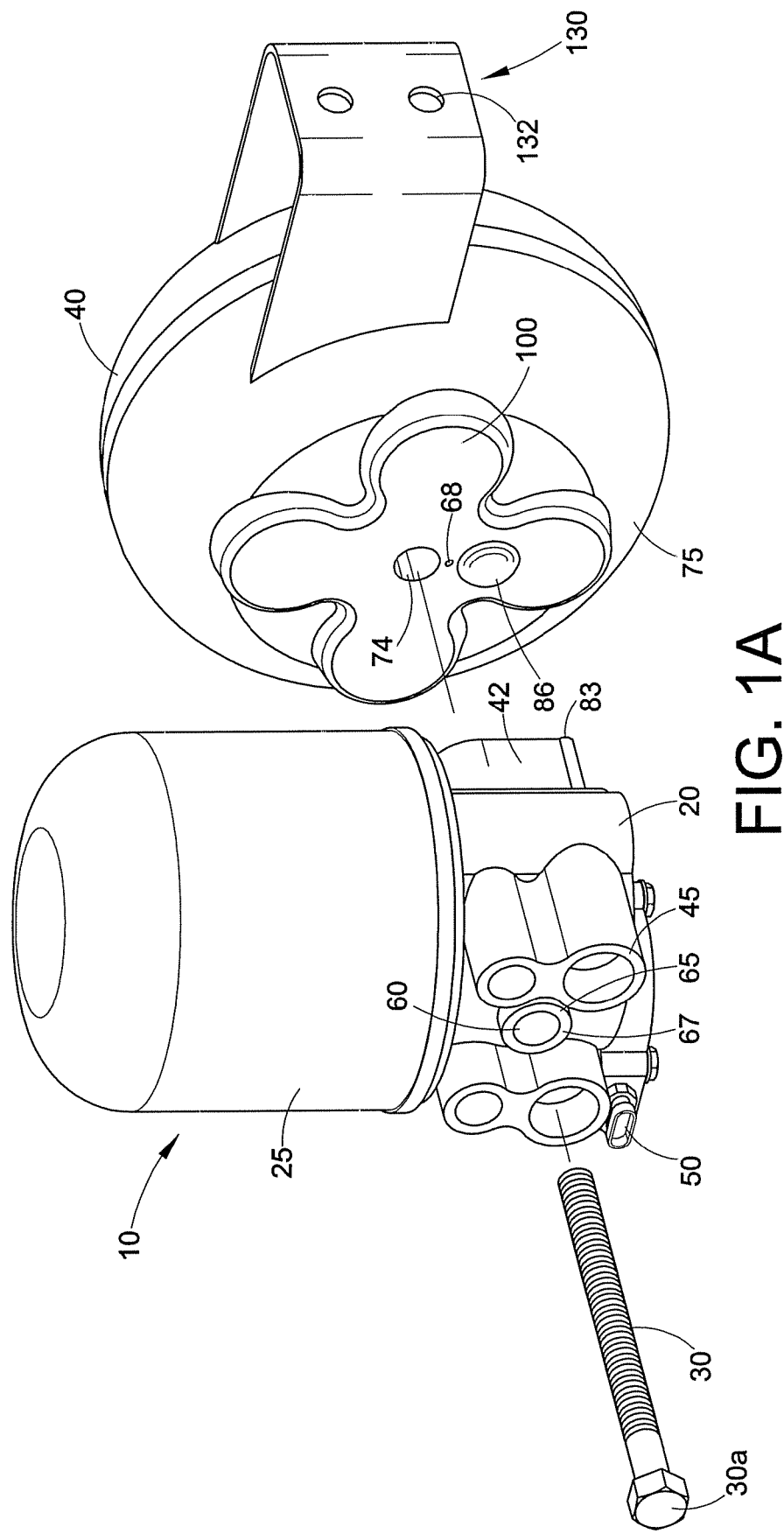
FIG. 1A is a prospective view of an air dryer assembly employing the single fastener method of mounting of the present invention.

The invention is a mounting assembly for an air dryer. A single fitting or two or more fittings may be used to secure the air dryer body. As such, the air dryer can be secured to various locations on the vehicle, including reservoir surfaces which are not flat. The mounting arrangement takes advantage of a central mounting arrangement of the air dryer and employs means for preventing rotation. Furthermore, the assembly includes a uniform passageway that retains a securing fitting and also acts as the purge volume passageway. The description included below will be directed to embodiments of this invention.

As shown in FIG. 1, the single fitting air dryer assembly 10 includes an air dryer manifold 20, an air dryer canister 25, and a specialized fitting, fastener or bolt, 30. One skilled in the art should appreciate that the bolt, fastener or specialized fitting 30 can be any type of fitting such as to affix the manifold 20 to the vehicle, and as such the terms bolt, fastener and fitting should not be construed as limiting the type of attachment means included within the scope of this application. For example, it is contemplated that the fastener may be threaded or non-threaded or can be a quick-connect fastener or push-to-connect fastener. As discussed further herein, the assembly may also include a reservoir 40.

Figure 4:
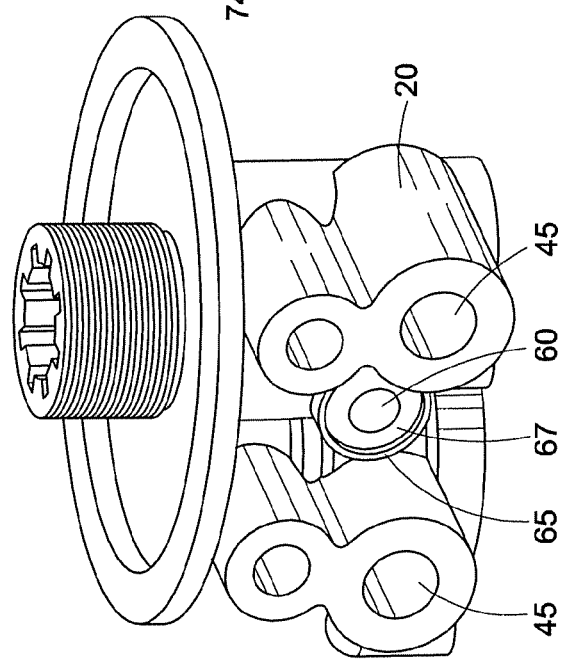
FIG. 4 is a prospective view of an air dryer manifold used in connection with the air dryer assembly shown in FIG. 1A.

The manifold 20 and air dyer canister 25 can be a variety of conventional components. The air dryer canister 25 is a conventional desiccant canister with a set of threads running through an opening on the underside of the cartridge that receives a set of mating threads protruding from the center of the air dryer manifold 20. Preferably, but not necessarily, the threads are between 36 mm and 50 mm. In one embodiment, the threads are 41 mm, while in another embodiment, the threads are 42 mm. Optionally, an adapter can be used to make the canister 25 with 50 mm threadsadapt to 39 mm standard threads, for example. The air dryer manifold 20 can have any number of inlet and outlet ports 45, four such ports are shown in FIGS. 1 and 4. In one embodiment, the air dryer manifold 20 includes a purge valve 50 and a check valve 54, while other embodiments include just a purge valve 50 or just a check valve 54. The air dryer manifold 20 can be made entirely from plastic or it can be made from plastic with metallic inserts, or in other embodiments, the manifold can be made from metal. Examples of the plastic that can be used to make the air dryer manifold 20 include Nylon 6, Delrin or accetel.

The manifold 20 includes a central bore 60 and a mounting extension 42. The central bore 60 has a front end 65 containing a recessed surface 67 and a back end 69 that extends through the extension 42 and forms a recessed surface 70. The recessed surface can be any suitable shape including, but not limited to, circular, ovular, or tear-drop shaped. This mounting arrangement can take advantage of a central mounting arrangement of the air dryer assembly, thereby only requiring one connective bolt 30. The bolt, or fastener, 30 slides through the bore 60 such that the head of the bolt 30a contacts the recessed surface 67, which may optionally include an o-ring. The threads of the bolt are received either onto a mounting bracket (not shown) or, preferably, into a threaded connection 74 in a reservoir 40. The reservoir 40 includes a purge hole 68 that aligns with a purge hole extension 66 in the back end 69 of the central bore 60. This allows for communication between the air dryer manifold 20 and the purge volume in the reservoir 40 and also allows for a tight connection between fastener 30 and the reservoir 40. Additionally, a gasket (not shown) can be placed along the perimeter of the back end 69 of the central bore 60 thereby providing a good air tight seal. It should be appreciated by one skilled in the art that the purge hole 68 can connect to the central bore 60 in other manners, such as, for example, direct overlap of the purge hole and the central bore or an extension of the reservoir hole 74 to overlap the central bore or purge hole extension 68.

Figure 3:
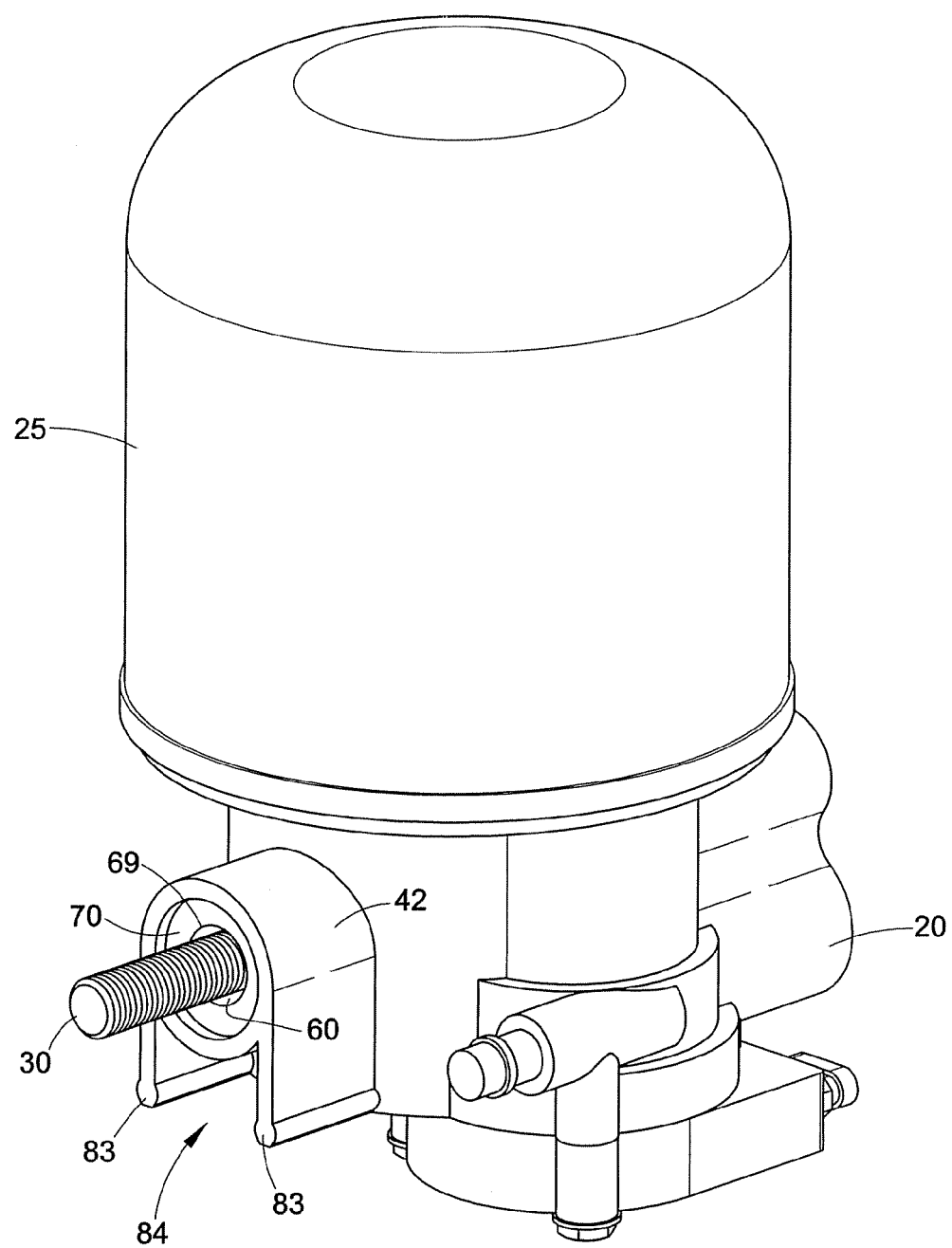
FIG. 3 is a prospective view of the back of the air dryer assembly shown in FIG. 1A.
Figure 9:
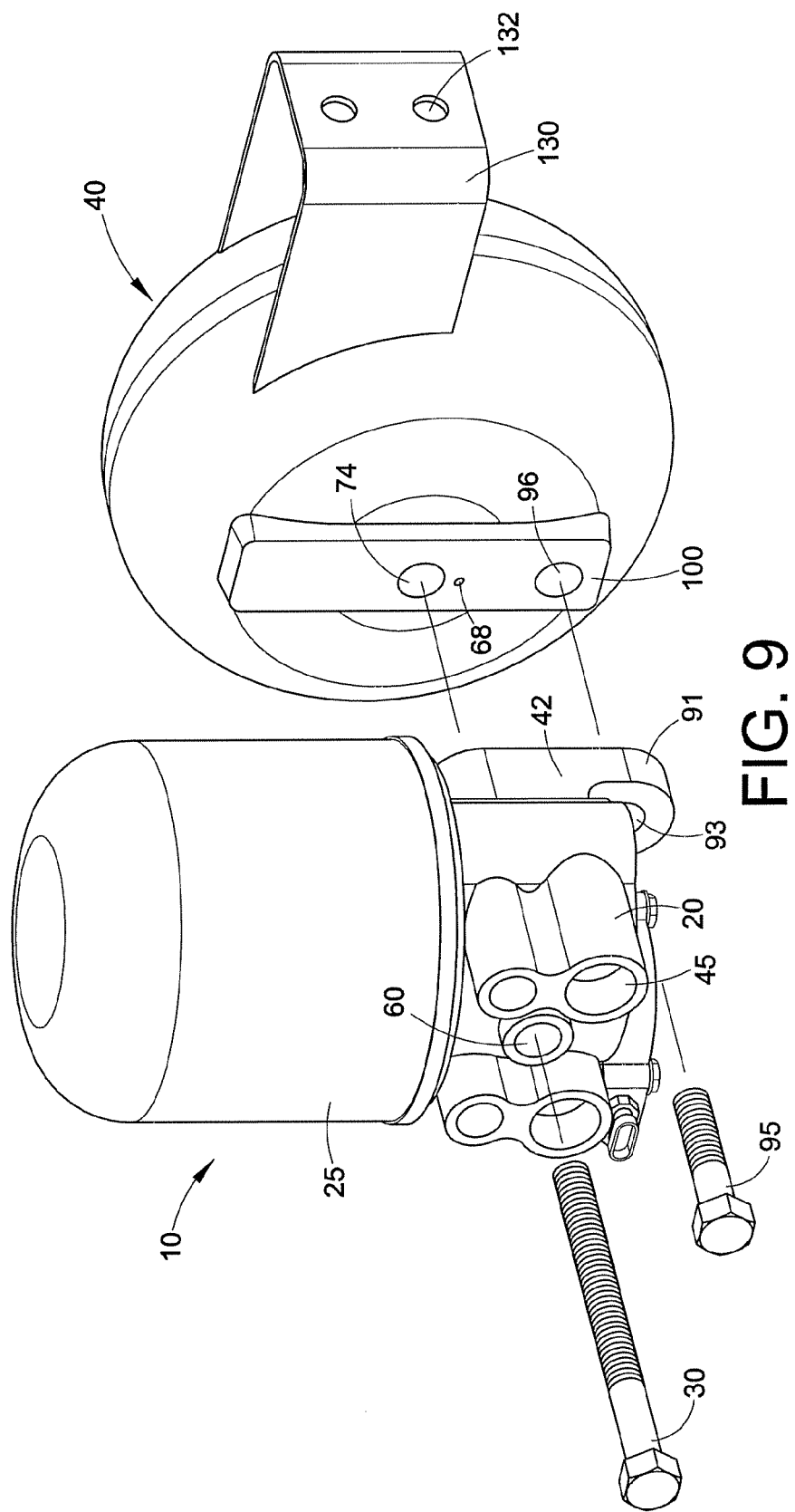
FIG. 9 is a perspective view of an air dryer assembly employing the two fastener method of mounting of the present invention.
Figure 10:
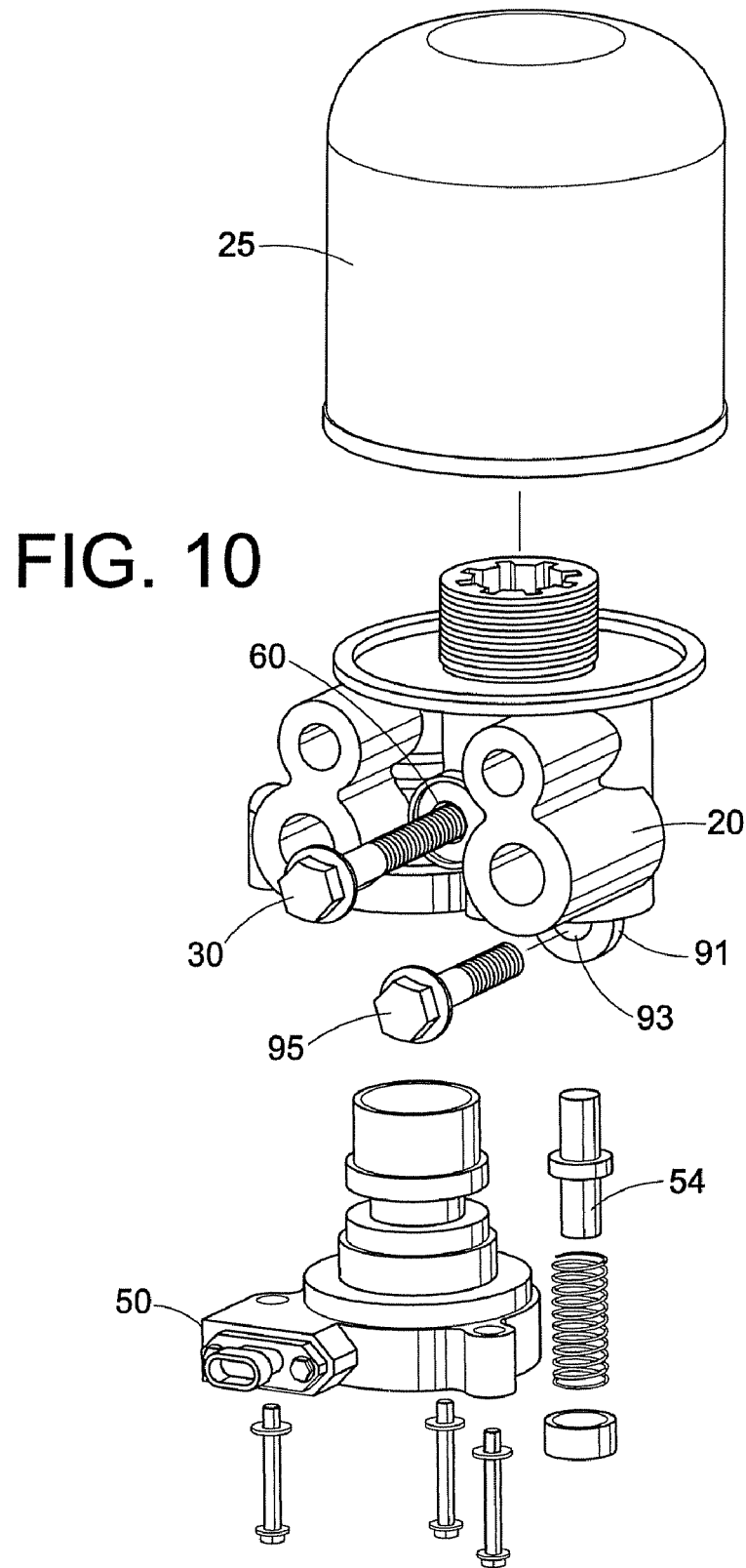
FIG. 10 is an exploded view of the air dryer assembly shown in FIG. 9.
Figure 11:
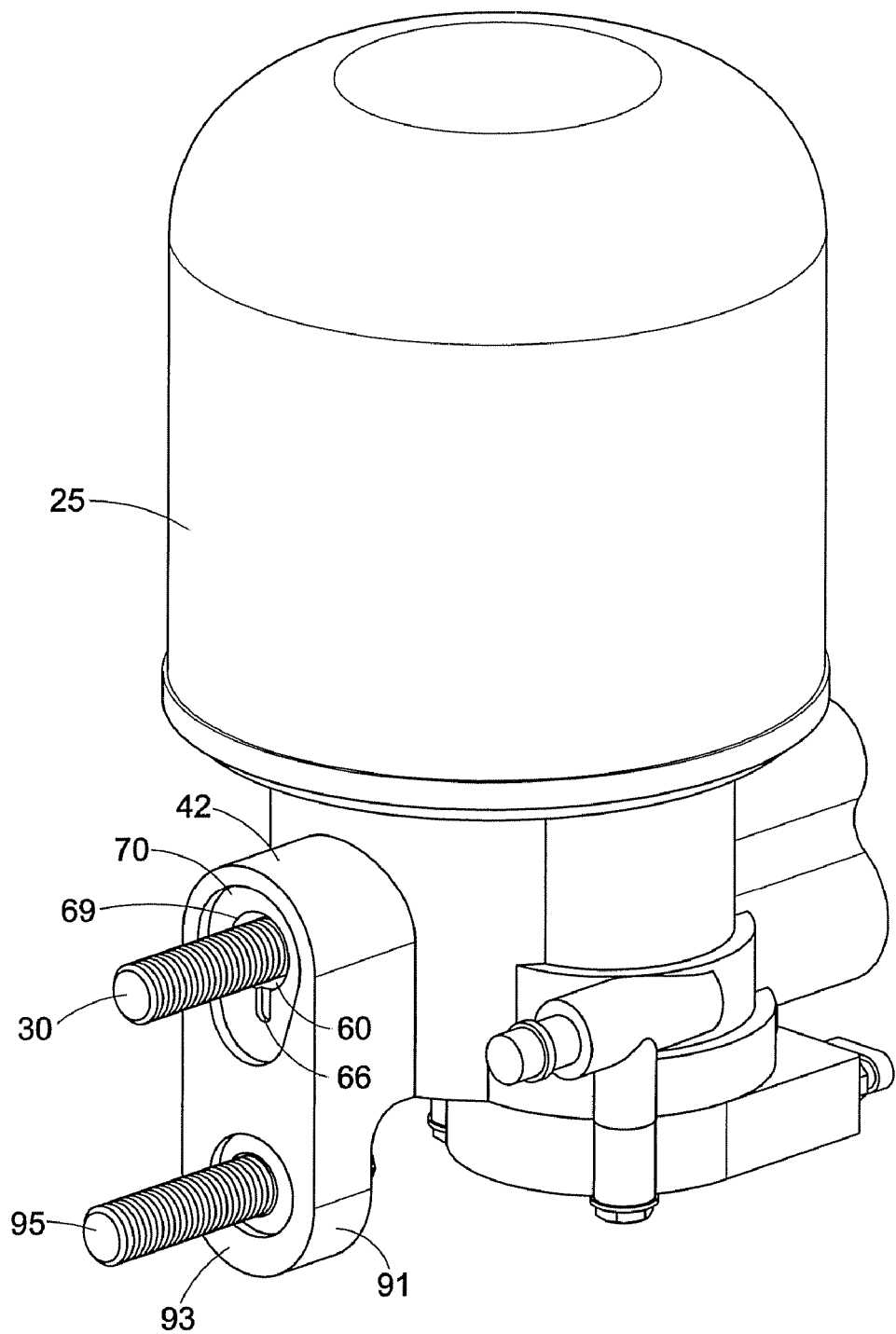
FIG. 11 is a prospective view of the back of the air dyer assembly shown in FIG. 9.
Figure 15:
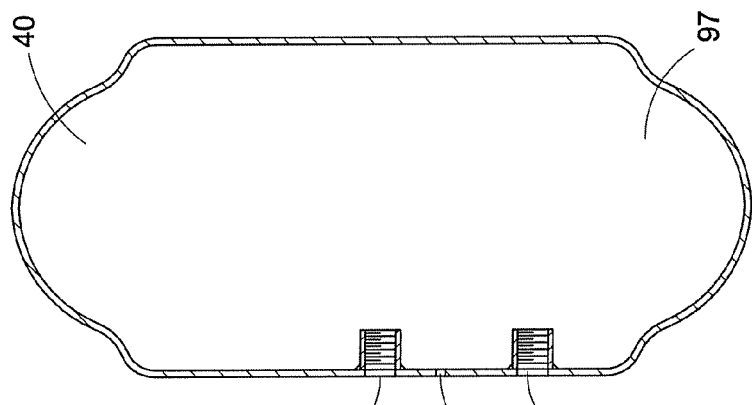
FIG. 15 illustrates a section view of the reservoir as shown in FIG. 9, wherein an alternative threaded member is illustrated.
Figure 13:
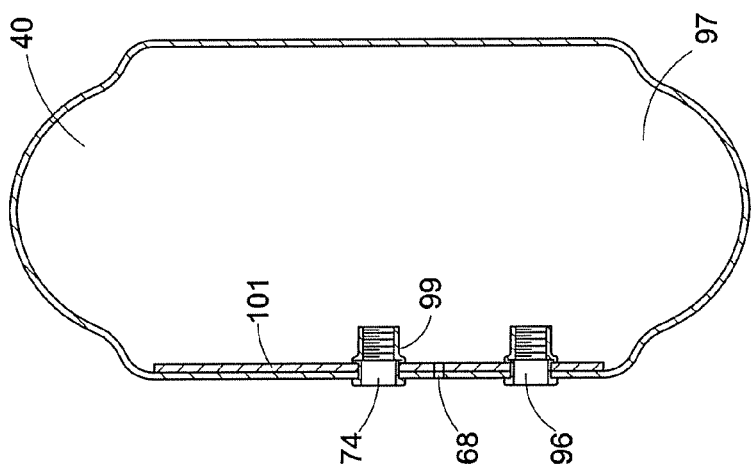
FIG. 13 illustrates a section view of the reservoir as shown in FIG. 9.
Figure 12:
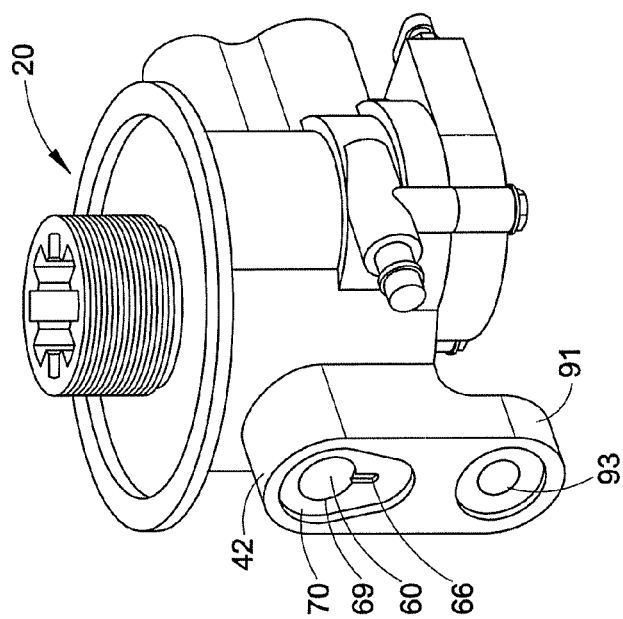
FIG. 12 is a prospective view of an air dryer manifold used in connection with the air dryer assembly shown in FIG. 9.
Figure 14:
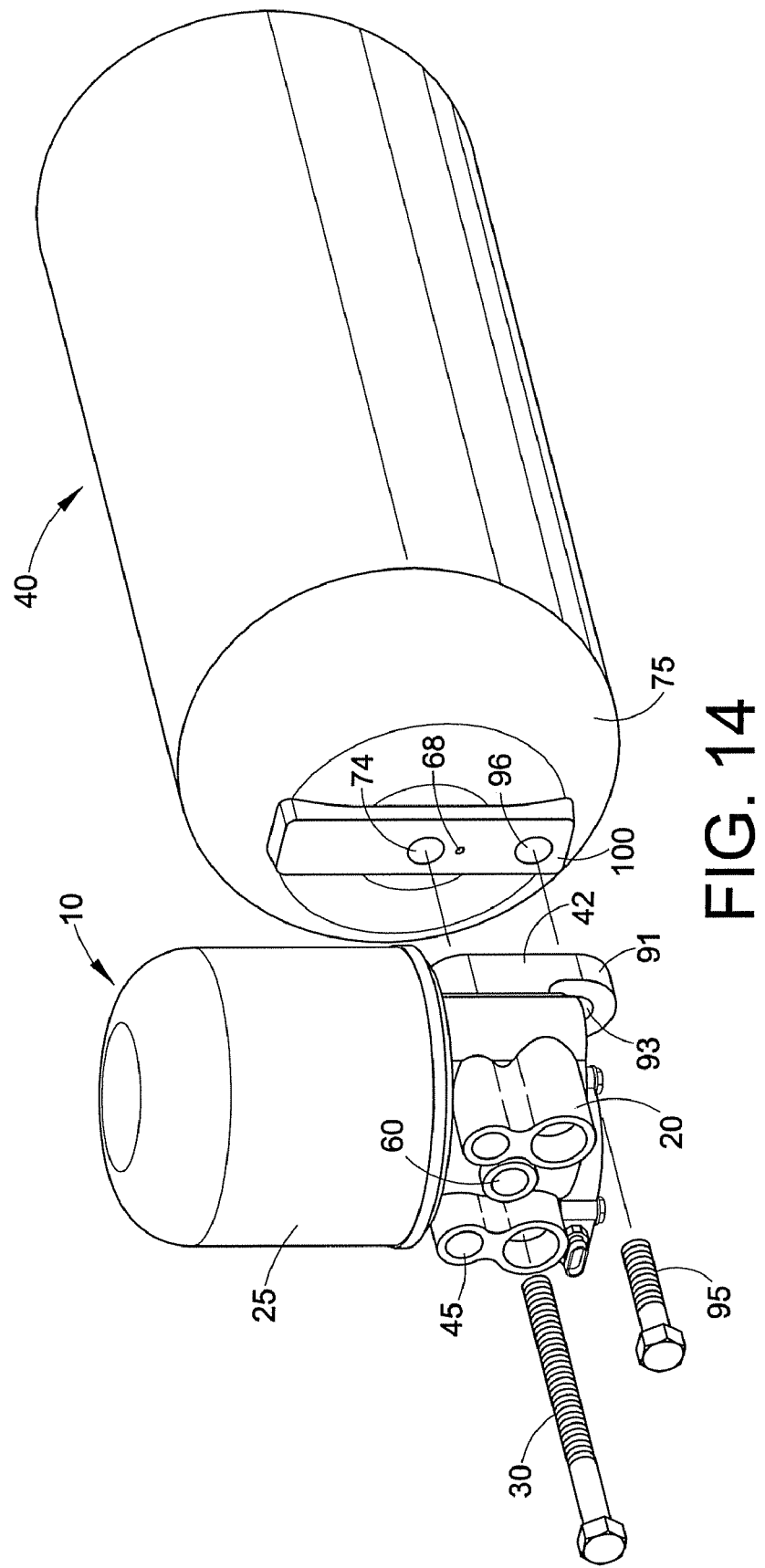
FIG. 14 illustrates the mounting of the air dryer of FIG. 9 on another air reservoir embodiment.

In order to prevent the air dryer from rotating about its central axis, position stabilizers may be used to secure the air dryer. The type of position stabilizer used can vary. One such embodiment employs interlocking retention pegs (not shown) extending from recessed surface 70 and along reservoir hole 74. When the air dryer manifold 20 is secured against the head 75 of the reservoir, the corresponding pegs engage to prevent rotation of the manifold 20 with respect to the reservoir 40. In another embodiment, the retention pegs are only located along reservoir hole 74 and interlock with edges formed in the recessed surface 70. In another embodiment, as best shown in FIGS. 1 and 3, the extension 42 includes two arms 83 that form a generally u-shaped area 84. The head 75 of the reservoir 40 includes a projection 86 which resets between the arms 83 in the u-shaped area 84 when the manifold is brought into contact with the reservoir 40. When projection 86 is secured between arms 83, the manifold 20 cannot rotate about its axis. In another embodiment, as best shown in FIGS. 9 and 11, the extension 42 includes a tab 91 with a hole 93 therein, through which a secondary bolt 95 can pass. The secondary bolt can thread into a second threaded hole or connection 96 in the reservoir 40. As shown in FIGS. 13 and 15, the treaded connection 96 can be a rivet nut. Other embodiments use combinations of these stabilizing elements, or other mechanisms.

Figure 1B:
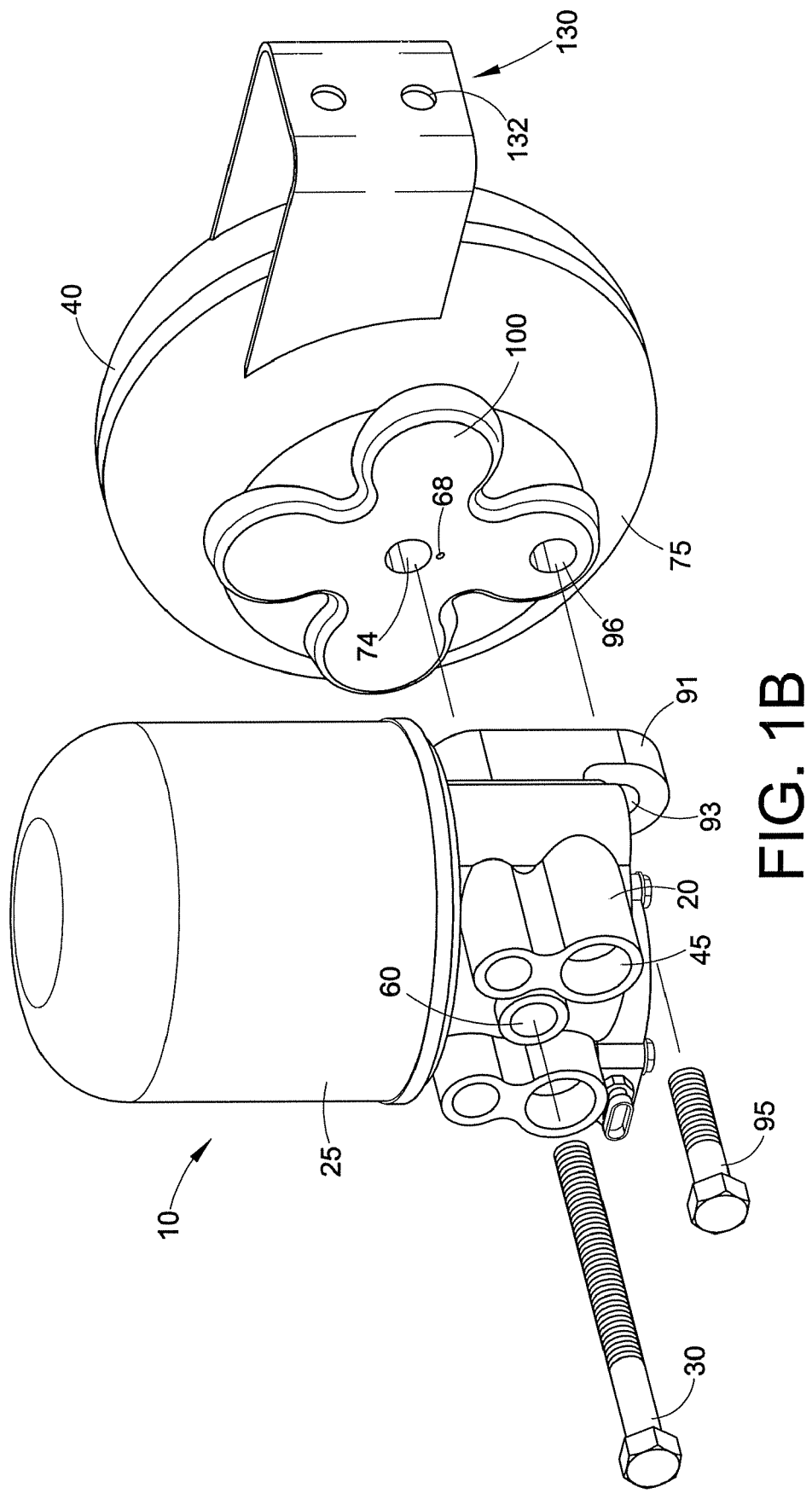
FIG. 1B is a prospective view of an air dryer assembly employing a two fastener method of mounting of the present invention.
Figure 2:
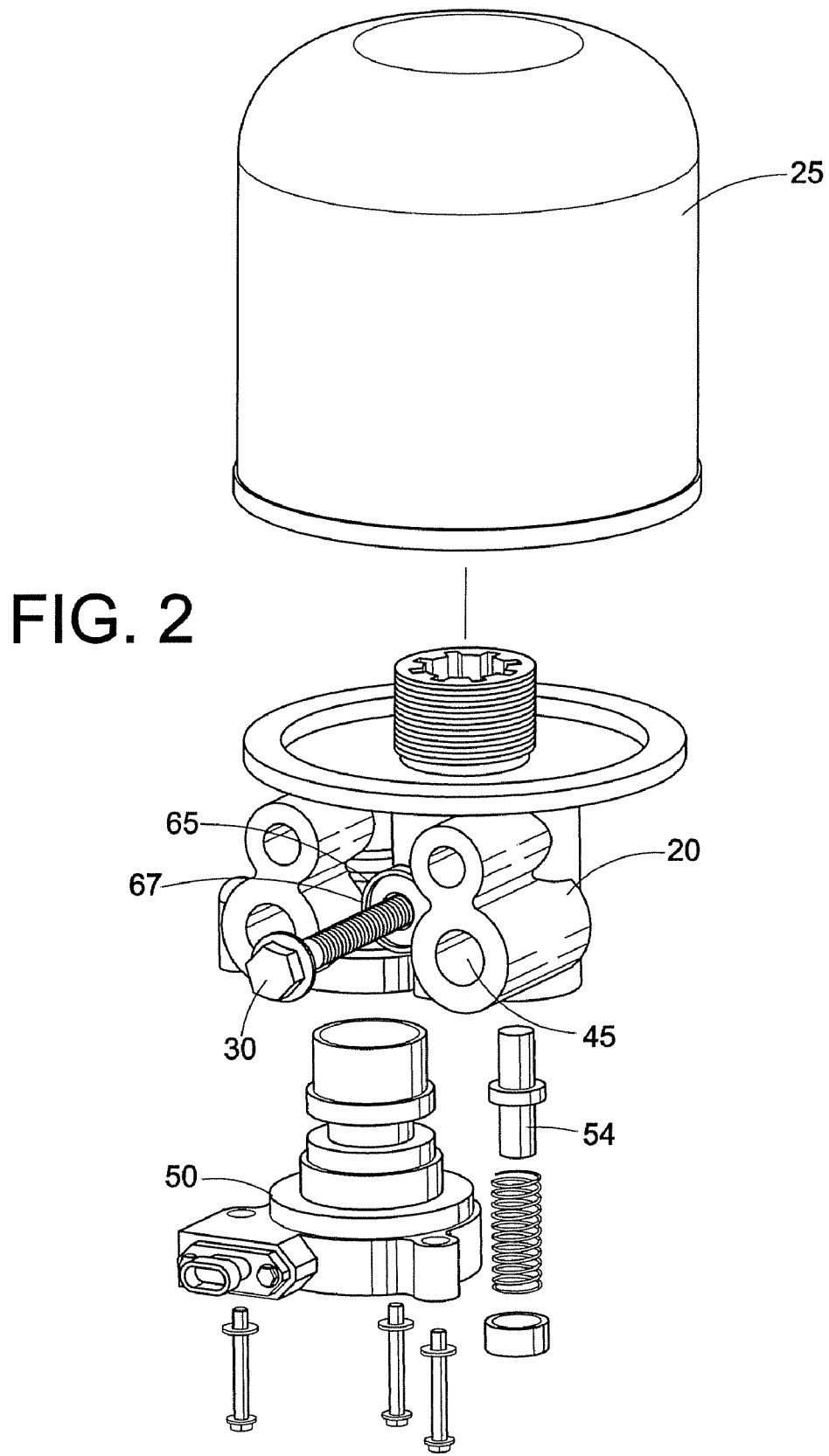
FIG. 2 is an exploded view of the air dryer assembly shown in FIG. 1A.
Figure 7:
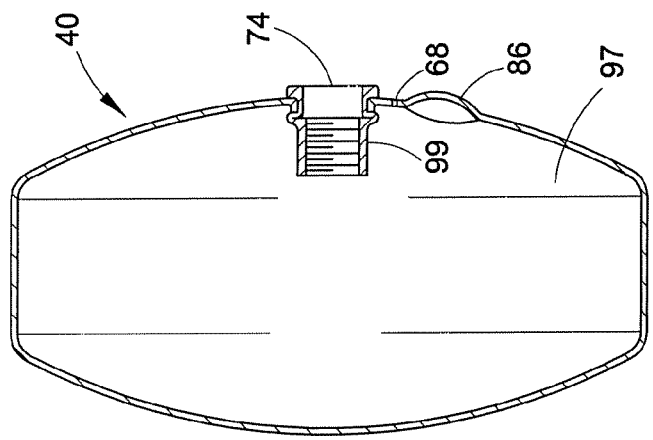
FIG. 7 illustrates a sectional view of another embodiment of the reservoir as shown in FIGS. 1A & 1B, with a different threaded joint to receive an air dryer.
Figure 6:
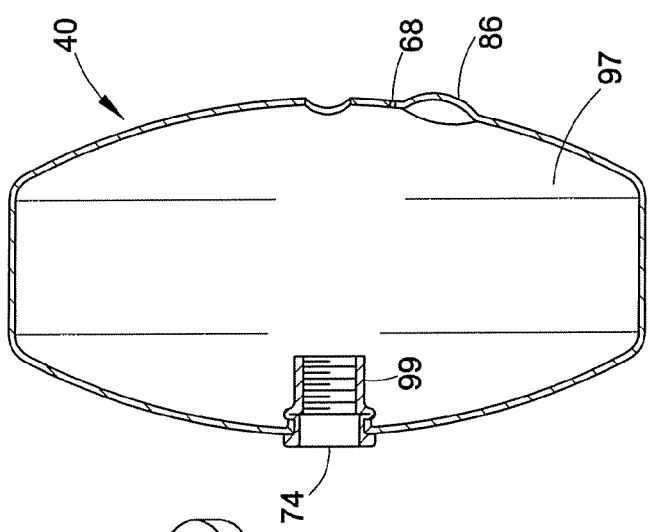
FIG. 6 illustrates a sectional view of the reservoir as shown in FIGS. 1A & 1B.

As shown in FIG. 6, the reservoir hole 74 can open into the interior 97 of the reservoir such as to allow the bolt 30 to connect through to the threaded connection 99 located at the back of the reservoir 40. This type of connection provides additional support and prevents deformation of the head 75 of the reservoir. In FIG. 7, the threaded connection 99 can be located at the front of the reservoir 40. It should be understood by one skilled in the art that the threaded connection 99 can be any number of connections, such as, for example, a rivet nut, a plus nut, or a ferrule projection welded onto the interior surface of the reservoir. Some illustrative examples are shown in FIGS. 13 and 15. The reservoir 40 may include an embossment 100 on the head 75 in order to facilitate mounting of the air dryer. FIGS. 1A & 1B shows the one such embossment 100, while FIG. 9 shows another embossment embodiment. Additionally, the reservoir 40 may be divided into two or more sections, divided by bulk heads. In this manner, the most forward section acts as the purge reservoir for the air dryer 10, while the other sections of the reservoir can be used for other purposes, such as the primary or secondary service brake reservoirs. Additionally, as shown in FIG. 13, a support plate 101 can be fastened or welded to the interior surface of the reservoir in order to provide further support.

The bolt 30 intersects the flow path through the air dryer manifold 20 such that the air may pass through the bore 60 along the bolt threads and into or out of the reservoir 40. The bolt 30 may be a special fitting to assist in this functionality. Such a special fitting would includes threads, a counter-bore (not shown) and a cross-drilled hole (not shown) that would allow the dryer to access the purge volume locate in the reservoir 40. The special fitting eliminates the need for an external line to connect the air dryer 10 with the purge volume located in the reservoir 40.

Figure 8:
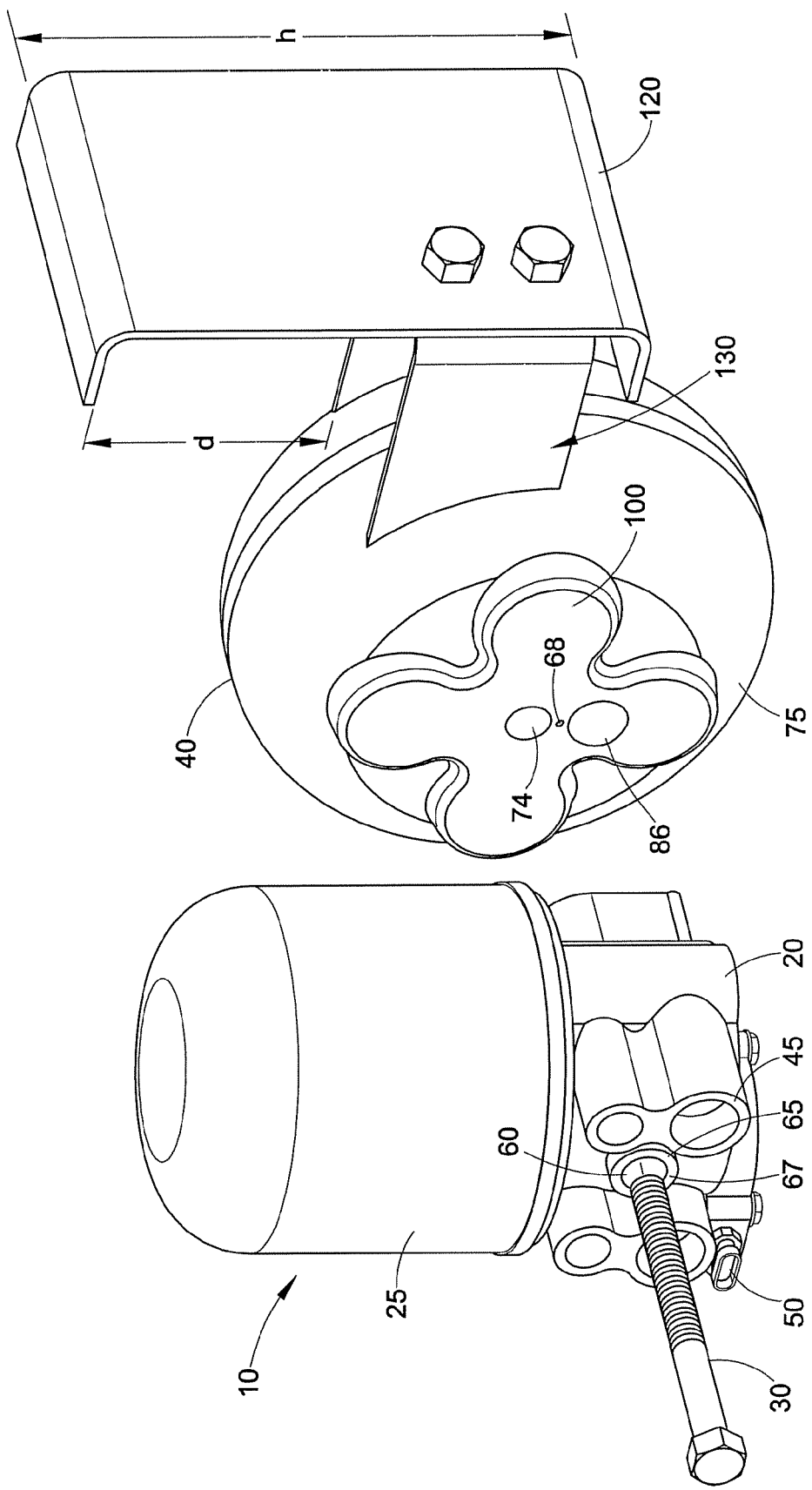
FIG. 8 illustrates the mounting arrangement of the air dryer shown in FIGS. 1, 6 and 7 on a truck frame rail.

As shown in FIG. 8, the reservoir 40 can be mounted to a truck rail 120 in a much more efficient method. The reservoir 40 includes mounting bracket 130 with two mounting holes 132 which is directly welded to the reservoir. Unlike conventional mounting brackets, the mounting bracket 130 of the present invention can be employed without the need of the additional brackets and straps which make conventional air dryer mounting brackets cumbersome and more expensive. Furthermore, mounting bracket 130 is much smaller than conventional mounting brackets. As a result, space d is freed up along the truck rail 120. While conventional mounting brackets use 80–100 percent of the truck rail height h, mounting bracket 130 can use less than 75 percent, and preferably less than 50 percent. Depending on the truck rail employed, it is conceived that the mounting rail 130 can consume as little as 15 to 30 percent of the truck rail height h and still adequately secure the reservoir 40 and air dryer assembly 10.

As such, this disclosure provides for an improved mounting assembly for an air dryer. The air dryer includes a central bore 60 wherein a special fitting 30 is threaded. The fitting 30 is then received into the reservoir 40, preferably the center of the reservoir head 75 to ensure stability. The air dryer 40 is aligned so that position stabilizers secure the air dryer and prohibit it from rotating along its central axis. The fitting 30 is then tightened down to provide for secure mounting of the air dryer 10. The fitting 30 is further adapted to allow for communication between the air dryer 10 and the reservoir 40 through the central bore 60.

The air dryer assembly also provides for improved air drying, as the first air through the air dryer can be stored in the purge volume and, once the purge volume is full, then supply air downstream. During the purge cycle, the purge volume is depleted, using the first air that was dried by the air dryer and thereby providing the driest air for regenerating the desiccant. This method of drying air is further disclosed in commonly assigned U.S. Pat. No. 6,585,806 issued Jul. 1, 2003, the disclosure of which is hereby fully incorporated by reference.

The invention has been described with reference to the preferred embodiments. Obviously, modifications and alterations will occur to others upon a reading and understanding of the detailed description. The invention is intended to include all such modifications and alterations insofar as they come within the scope of the accompanying claims and the equivalents thereof.

The invention claimed is:

1. A method of drying air in a compressed air system of a vehicle, comprising the steps of:
    delivering a flow of air to an air dryer manifold with a desiccant bed canister attached to a threaded portion of said manifold;
    passing said flow of said air through the desiccant bed, thereby drying the air;
    delivering the dried air to a set of downstream components;
    purging the desiccant bed with a purge flow from a purge volume to regenerate the desiccant bed; and
    exhausting said purge flow after it has passed through said desiccant bed;
    wherein said purge flow passes from said purge volume via a bore in said manifold in which a fastener securing said air dryer to the vehicle is inserted through;
    wherein said purge flow passes external to said fastener.

2. The method of claim 1 wherein said purge volume is stored in an external reservoir coupled to a rail of the vehicle.

3. The method of claim 2 wherein said rail of said vehicle has a height, and wherein said reservoir includes a mounting bracket for coupling to said rail, said mounting bracket having a height that is less than 50 percent of said rail height.

4. The method of claim 1 wherein one or more stabilizing mechanisms interlock to prevent rotation of the air dryer relative to the vehicle.

5. The method of claim 4 wherein said one or more stabilizing mechanisms includes a second fastener received by a threaded member.

6. An air dryer assembly comprising:
    an air dryer including a manifold and desiccant cartridge connected to a threaded portion of said manifold; and
    a means for securing said air dryer to an external air reservoir, wherein said external air reservoir includes a purge volume;
    wherein means for securing said air dryer includes a means for communicating air between said air dryer and said purge volume and a fastening means disposed within said means for communicating air between said air dryer and said purge volume, said fastening means securing said air dryer to said air reservoir, wherein said air being communicated between said air dryer and said purge volume passes external to said fastening means.

7. The air dryer assembly of claim 6, further comprising a means for stabilizing the air dryer and preventing rotation of the air dryer about its central axis.

8. The air dryer assembly of claim 7, wherein said means for stabilizing the air dryer includes a set of two or more arms protruding from said manifold and a projection extending from a surface of the reservoir, wherein said protrusion rests between said arms and prevents rotation of said air dryer when said air dryer is secured to said reservoir.

9. The air dryer assembly of claim 7, wherein said means for stabilizing the air dryer includes a bolt received by a threaded member.

10. The air dryer assembly of claim 6, wherein said assembly is used in connection with a commercial vehicle air brake system.

11. The air dryer assembly of claim 6, wherein said desiccant cartridge contains a set of threads which are used to thread the cartridge onto said threaded portion of said manifold.

12. The air dryer assembly of claim 11, wherein said set of threads and said threaded portion are 41 mm.

13. The air dryer assembly of claim 6 wherein said external reservoir includes a mounting bracket for coupling to a rail of a commercial vehicle.

14. The air dryer assembly of claim 13 wherein said rail of said commercial vehicle has a height, and wherein said mounting bracket includes a height that is less than 50 percent of said rail height.

15. The air dryer assembly of claim 6 wherein said means for communicating air between said air dryer and said purge volume includes a bore in said manifold.

16. The air dryer assembly of claim 15 further comprising a mounting extension, wherein said bore extends through said mounting extension.

17. The air dryer assembly of claim 6 wherein said reservoir includes a purge hole in communication with said means for communicating air between said air dryer and said purge volume.

* * * * *